(12) United States Patent
Kray et al.

(10) Patent No.: US 12,710,020 B1
(45) Date of Patent: Aug. 18, 2026

(54) RIBBED SPINNER FOR TURBOFANS

(71) Applicant: General Electric Company, Evendale, OH (US)

(72) Inventors: Nicholas J. Kray, Mason, OH (US); Li Zheng, Cohoes, NY (US); Changjie Sun, Clifton Park, NY (US); Arthur W. Sibbach, Boxford, MA (US); Brandon W. Miller, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/270,893

(22) Filed: Jul. 16, 2025

(51) Int. Cl.
*F02K 3/00* (2006.01)

(52) U.S. Cl.
CPC .................................... *F02K 3/00* (2013.01)

(58) Field of Classification Search
CPC ........................................................ F02K 3/00
See application file for complete search history.

(56) References Cited

U.S. PATENT DOCUMENTS

| | | | | |
|---|---|---|---|---|
| 3,794,444 | A * | 2/1974 | Campbell | F01D 25/02 415/218.1 |
| 6,722,847 | B2 | 4/2004 | Freeman | |
| 7,721,526 | B2 | 5/2010 | Fujimura | |
| 7,748,950 | B2 | 7/2010 | Kodama | |
| 7,765,786 | B2 | 8/2010 | Klingels | |
| 8,616,854 | B2 | 12/2013 | Mahan | |
| 9,303,589 | B2 | 4/2016 | Heikurinen | |
| 10,670,037 | B2 | 6/2020 | Wadia | |
| 2019/0154055 | A1 | 5/2019 | Wadia | |

FOREIGN PATENT DOCUMENTS

| | | |
|---|---|---|
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |

(Continued)

*Primary Examiner* — Ibrahime A Abraham
*Assistant Examiner* — John S Hunter, Jr.
(74) *Attorney, Agent, or Firm* — Fitch, Even, Tabin & Flannery LLP

(57) ABSTRACT

An engine system including a spinner disposed at a forward end of the engine system, the spinner including a plurality of spinner ribs disposed on a surface of the spinner and extending radially outward from and rotating about a longitudinal centerline. The engine system further including a plurality of fan blades disposed downstream of the spinner and extending radially outward from and rotating about the longitudinal centerline. The engine system further including the spinner and the plurality of spinner ribs rotating independently from the plurality of fan blades and imparting additional pressure onto incoming air as air passes the spinner and the plurality of fan blades.

18 Claims, 10 Drawing Sheets

(56) References Cited

FOREIGN PATENT DOCUMENTS

| | | | |
|---|---|---|---|
| FR | 3130323 | 6/2023 | |
| FR | 3130747 | 6/2023 | |
| FR | 3130874 | 6/2023 | |
| FR | 3130875 | 6/2023 | |
| FR | 3130877 | 6/2023 | |
| FR | 3130879 | 6/2023 | |
| FR | 3130894 | 6/2023 | |
| FR | 3130895 | 6/2023 | |
| FR | 3130896 | 6/2023 | |
| FR | 3130897 | 6/2023 | |
| FR | 3132279 | 8/2023 | |
| FR | 3132729 | 8/2023 | |
| FR | 3132743 | 8/2023 | |
| FR | 3133367 | 9/2023 | |
| FR | 3133368 | 9/2023 | |
| WO | WO-2013092279 A1 * | 6/2013 | ............. F02C 7/045 |

* cited by examiner

RIBBED SPINNER FOR TURBOFANS

FIELD OF THE DISCLOSURE

The present subject matter relates generally to engines, and specifically to engine spinners.

BACKGROUND

Turbine engines include a spinner at a forward end of the engine and a plurality of fan blades disposed downstream thereof. Increasing the air ingestion of the turbine engine can enhance engine performance.

BRIEF DESCRIPTION OF DRAWINGS

A full and enabling description of the present disclosure, including the best mode thereof, directed to one of ordinary skill in the art, is set forth in the specification, which makes reference to the appended figures, in which.

Figure 1:
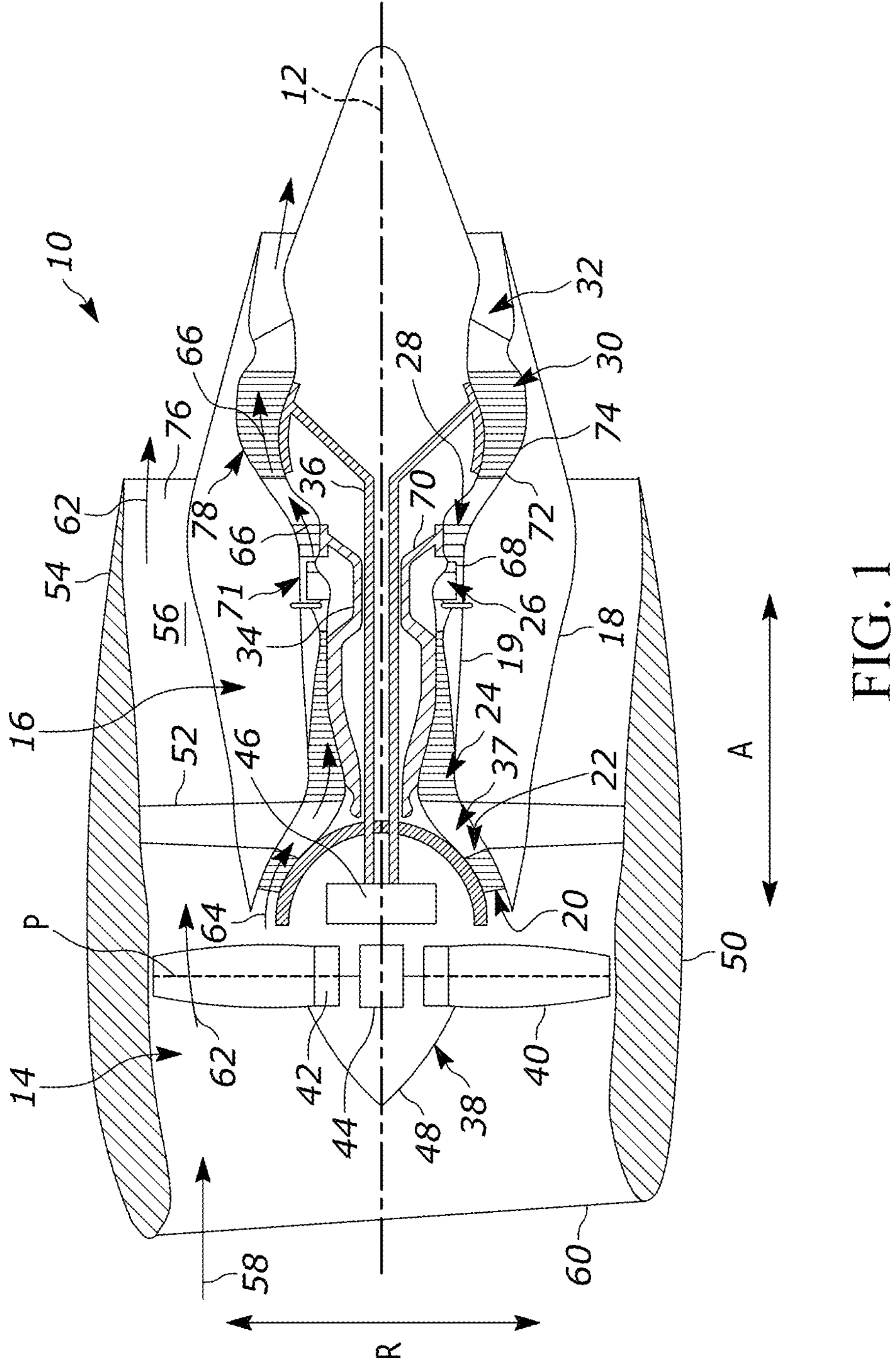
FIG. 1 is a cross-sectional side view of an embodiment of a propulsion system according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the approaches described herein, a ribbed spinner is provided for aircraft engines. These approaches allow for the independent rotation of the spinner (and its ribs) compared to rotation of the fan blades of the engine. In addition, specific ranges of dimensions and shapes for the ribs are provided. Advantageously, these features provide additional pressure onto incoming air as the air passes the ribbed spinner which may increase hub pumping of the air into the engine core. Further, the ribbed spinner may aid in preventing or decreasing the number of ingestion events, such as the ingestion of birds into the engine, preventing or minimizing certain engine conditions, such as reverse thrust conditions for an unducted engine, and increasing a stiffness or rigidity of the spinner itself and reduce localized frequency reverberations of the spinner.

As used herein, the terms “first,” “second,” “third,” etc. may be used interchangeably to distinguish one component from another and are not intended to signify location or importance of the individual components.

The terms “coupled,” “fixed,” “attached to,” and the like refer to both direct coupling, fixing, or attaching, as well as indirect coupling, fixing, or attaching through one or more intermediate components or features, unless otherwise specified herein.

The singular forms “a,” “an,” and “the” include plural referents unless the context clearly dictates otherwise.

The word “or” when used herein is interpreted as having a disjunctive construction rather than a conjunctive construction unless otherwise specifically indicated.

The terms “forward” and “aft” as may be used herein refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

The terms “upstream” and “downstream” refer to the relative direction with respect to fluid flow in a fluid pathway. For example, “upstream” refers to the direction from which the fluid flows, and "downstream" refers to the direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Turbine engines include ducted and unducted engines. Both ducted and unducted engines include a plurality of fan blades upstream from an air inlet into the engine. The fan blades aid in the ingestion of air into the inlet, and in some instances, aid in protecting against ingestion events of foreign objects, such as birds, into the core of the engine. The fan blades, both in ducted systems and unducted systems may be limited by a number of factors. These factors can include, for example, pressure loss at the hub or casing of the engine, rotational speed, size, and other limiting factors. Because of this, increasing the air ingested into the engine is desirable.

The particular approaches described herein are particularly applicable to unducted aircraft engines. A turbofan engine operates on the principle that a central gas turbine core drives a bypass fan, the bypass fan being located at a radial location between a fan duct and the engine core. An unducted propulsion system operates on the principle of having the bypass fan not located within a fan duct. Removal of the fan duct permits the use of larger fan blades able to act upon a larger volume of air than a bypass fan located within a fan duct. An unducted propulsion system can have an improved propulsive efficiency over a ducted turbofan engine.

Generally speaking, turbofan engines produce 100% of their thrust with ducted exhaust streams. In examples, unducted aircraft engines produce approximately 80% of their thrust with their (unducted) fan blades and around 20% with ducted exhaust streams. Turbofan testing measures thrust but not torque on the ground testing. Turbofans do not need testing hardware to simulate air flow into the engine because they are already ducted, and commonly are tested measuring airflow entering the engine inlet.

Turboprop engines have a propeller that generally provides approximately 95% of the thrust with their propeller blades and 5% with exhaust streams. Turboprop engines typically operate at slower range of flight speeds and, generally speaking, the propeller arrangement and power generation portion of the engine are manufactured by different sources. Testing of turboprop engines does not measure thrust and measures torque on the ground. Turbofan, turboprop, and unducted aircraft engines typically may also include engine sensors to measure variable geometry system positions, pressure, temperature, fuel flow, and shaft speed.

It would be appreciated that the terms "fan blades" and "propellers" are used herein to describe the blades, elements, components, or instruments used to direct air through or about an aircraft engine. It will be understood that these terms are interchangeable in this description.

To aid in the ingestion of air, ribs may be disposed on a spinner upstream of the fan blades. By "spinner," it is meant a separate mechanical element (e.g., a cone) that is centered about the centerline of the engine, rotates separately and independently from the fan blades of the engine, and is located at the upstream end of the engine. The ribbed spinner aids in the ingestion of air by imparting additional pressure onto incoming air as the air passes the ribbed spinner, plurality of fan blades, and into the air inlet. The ribbed spinner may increase hub pumping into the core. Hub pumping includes imparting additional pressure, and in turn energy associated with the air passing by the ribbed spinner to increase the amount of flow of air passing by the spinner. For example, by imparting additional pressure, air that is passing near or in the vicinity of the spinner may be affected by the increased pressure associated with the air passing by the ribbed spinner and additional air may be sucked into the airflow passing by the ribbed spinner which, in turn, increases the amount (e.g., volume, flowrate and/or pressure) of air flow entering the air inlet of the turbine engine. Further, the ribbed spinner may aid in preventing or decreasing the number of ingestion events, such as the ingestion of birds into the engine. Because some ducted and unducted engines utilize lower rotational speed of the fan blades, providing a ribbed spinner aids in reducing these events. Additionally, the ribbed spinner aids in preventing or minimizing certain engine conditions, such as reverse thrust conditions for an unducted engine. Yet further, the ribbed spinner can increase a stiffness or rigidity of the spinner itself and reduce localized frequency. The ribbed spinner includes a plurality of spinner ribs disposed on a surface of the spinner. The plurality of spinner ribs are disposed circumferentially around the spinner.

As mentioned, the plurality of spinner ribs add stiffness to the spinner. This can lead to the ability to control spinner vibration mode or frequency, assisted in deicing the spinner be providing irregular flow over an otherwise smooth profile, and/or reduce the weight of the spinner while maintaining a certain rigidity and/or stiffness. Further, the plurality of spinner ribs can include an acoustic liner or surface treatment to reduce noise. Further, the spinner ribs may be defined as ribs disposed on an upstream section of the spinner and upstream from the fan blades. The spinner ribs provide the benefits described herein as the air progresses from the spinner and spinner ribs to the fan blades. The benefits described herein, as they relate to additional pressure, air ingestion, and stiffness of the spinner itself may be in addition to any benefits provided by existing fan blades.

The ribbed spinner may include many different variations. For example, in one embodiment, the ribbed spinner may spin in the same or opposite direction as compared to the plurality of fan blades. In one embodiment, the ribbed spinner may also spin at the same or different rotational speed as the plurality of fan blades. In one exemplary embodiment, the ribbed spinner spins in the same direction and at substantially the same rotational rate as the plurality of fan blades. In further examples, the ribbed spinner may spin in the opposite direction and at a different rotational rate as the plurality of fan blades. In one embodiment, the ribbed spinner is stationary relative to the plurality of fan blades. The ribbed spinner rotates independently from the fan blades. This enables an optimization of the benefits provided by the ribbed spinner while operating the engine, and in turn the fan blades, in an optimal manner.

In yet further embodiments, the axial length, radial height, and width of the spinner ribs disposed on the spinner are adjusted, alone or in combination, based on the particular use thereof. These are varied based on several factors, such as, for example, desired thrust of the engine, need for a structurally sound spinner rib, the ability to withstand foreign object contact, and material of construction. In some embodiments, the plurality of spinner ribs are disposed with a uniform or non-uniform spacing therebetween when looking along a longitudinal centerline of the turbine engine. Further, in some embodiments, the plurality of spinner are disposed with a uniform or non-uniform angle therebetween when looking along a longitudinal centerline of the turbine engine. In some configurations, the plurality of spinner ribs are disposed with substantially the same forward aft position on the spinner, relative to the axial length of the spinner. In one embodiment, the number of spinner ribs is greater than the number of fan blades. In further embodiments, the number of spinner ribs is less than the number of fan blades. The number of ribs, similar to the axial length, radial height, and width of the spinner ribs discussed above, may vary based on several factors, such as, for example, the number of fan blades, the rotational speed, the size of the engine, the diameter of the spinner, and the acoustic interactions between the spinner ribs and the fan blades.

In one configuration, the spinner ribs are comprised of a plurality of discrete portions. In another configuration, there is a combination of discrete spinner ribs and spinner ribs comprised of a plurality of discrete portions. The spinner ribs may be straight, curved, leaned, cambered, or a combination thereof. In some configurations, the spinner ribs are staggered along the axial length of the spinner such that their forward aft position is non-uniform. In some embodiments, an acoustic liner or sound treatment is disposed on or within a surface of the spinner ribs.

Referring now to FIG. 1, a schematic cross-sectional view of a turbofan engine 10 in accordance with an exemplary embodiment of the present disclosure. In the example embodiment, turbofan engine 10 is embodied in a high-bypass turbofan jet engine. As shown in FIG. 1, turbofan engine 10 defines an axial direction A (extending parallel to a longitudinal centerline 12 provided for reference) and a radial direction R. In general, turbofan engine 10 includes a fan assembly 14 and a core engine 16 disposed downstream from fan assembly 14.

In the example embodiment, core engine 16 includes an approximately tubular outer casing 18 that defines an annular inlet 20. A stationary shroud 19 defines an inner surface or boundary of outer casing 18. Outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects HP turbine 28 to HP compressor 24. A low pressure (LP) shaft or spool 36 drivingly connects LP turbine 30 to LP compressor 22. The compressor section, combustion section 26, the turbine section, and the jet exhaust nozzle section 32 together define a core air flowpath 37.

The fan assembly 14 includes a fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, disk 42, and actuation member 44 are together rotatable about the longitudinal centerline 12 by the LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the turbofan engine 10 includes a spinner 48 disposed at the upstream most portion of the turbofan engine 10. The spinner 48 is disposed upstream from the fan blades 40 and is connected thereto. Additionally, the fan assembly 14 includes an annular fan casing or outer nacelle 50 that circumferentially surrounds the fan 38 and/or at least a portion of the core engine 16. It should be appreciated that the outer nacelle 50 may be configured to be supported relative to the core engine 16 by a plurality of circumferentially-spaced outlet guide vanes 52. Moreover, a downstream section 54 of the outer nacelle 50 may extend over an outer portion of the core engine 16 to define a bypass airflow passage 56 therebetween.

During operation of turbofan engine 10, a volume of air 58 enters turbofan engine 10 through an associated inlet 60 of fan assembly 11, which includes the fan 38. As volume of air 58 passes across a plurality of fan blades 40 of fan 38, a first portion 62 of volume of air 58 is directed or routed into a bypass airflow passage 56 (between core engine 16 and the annular nacelle 50) and a second portion 64 of volume of air 58 is directed or routed into core air flowpath 37, or more specifically into LP compressor 22. A ratio between first portion 62 and second portion 64 is commonly referred to as a bypass ratio. The pressure of second portion 64 is then increased as it is routed through high pressure (HP) compressor 24 and into combustion section 26, where it is mixed with fuel and burned to provide combustion gases 66.

Combustion gases 66 are routed through HP turbine 28 where a portion of thermal and/or kinetic energy from combustion gases 66 is extracted via sequential stages of HP turbine stator vanes 68 that are coupled to outer casing 18 and HP turbine rotor blades 70 that are coupled to HP shaft or spool 34, thus causing HP shaft or spool 34 to rotate, which then drives a rotation of HP compressor 24. A gap 71 exists between a tip of blades 70 and stationary shroud 19, which causes a portion of the combustion gases 66 to leak thereover. This leakage creates a vortex just downstream of blades 70, which causes pressure loss and reduces the efficiency of HP turbine 28. Combustion gases 66 are then routed through LP turbine 30 where a second portion of thermal and kinetic energy is extracted from combustion gases 66 via sequential stages of LP turbine stator vanes 72 that are coupled to outer casing 18 and LP turbine rotor blades 74 that are coupled to LP shaft or spool 36, which drives a rotation of LP shaft or spool 36 and LP compressor 22 and/or rotation of fan 38.

Subsequently, the combustion gases 66 are routed through the jet exhaust nozzle section 32 of core engine 16 to provide propulsive thrust. Simultaneously, the pressure of first portion 62 is substantially increased as first portion 62 is routed through bypass airflow passage 56 before it is exhausted from a fan nozzle exhaust section 76 of turbofan engine 10, also providing propulsive thrust. HP turbine 28, LP turbine 30, and jet exhaust nozzle section 32 at least partially define a hot gas path 78 for routing combustion gases 66 through core engine 16.

Turbofan engine 10 is depicted in FIG. 1 by way of example only, and that in other exemplary embodiments, turbofan engine 10 may have any other suitable configuration including for example, a turboprop engine.

Figure 2:
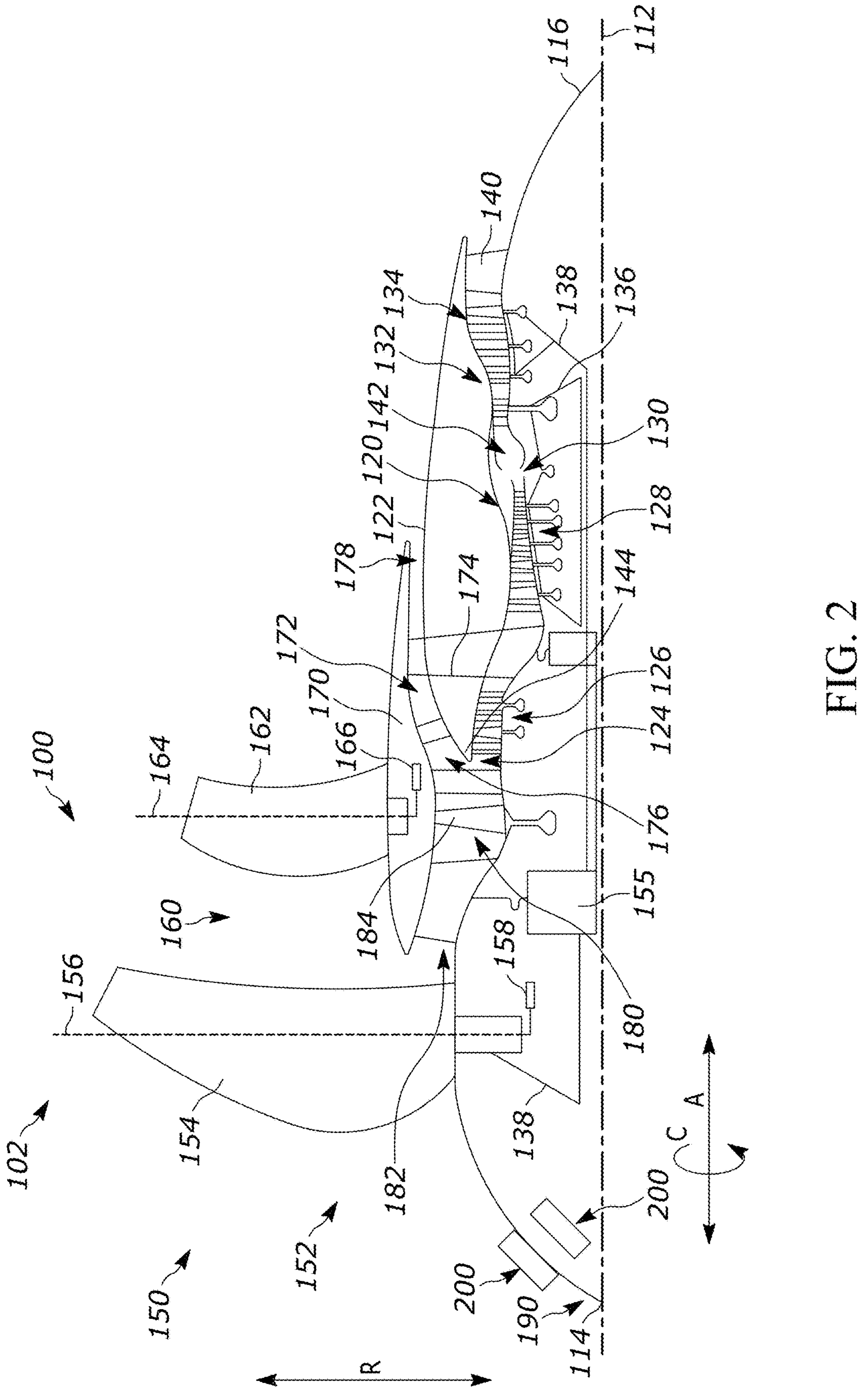
FIG. 2 is a cross-sectional side view of an embodiment of a propulsion system according to some embodiments.

Referring now to FIG. 2, a schematic cross-sectional view of a gas turbine engine 100 is provided according to an example embodiment of the present disclosure. Effector position measuring methods and systems described herein may be implemented within one or more actuators of the gas turbine engine 100.

It will be appreciated, however, that the exemplary single rotor unducted engine (e.g., the gas turbine engine 100) depicted in FIG. 2 is by way of example only, and that in other exemplary embodiments, the gas turbine engine 100 may have any other suitable configuration, including, for example, any other suitable number of shafts or spools, turbines, compressors, etc.; fixed-pitch blades, a direct-drive configuration; etc. For example, in other exemplary embodiments, the gas turbine engine 100 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, a turbojet engine, a rotorcraft engine, a ducted engine with variable pitch blades, etc. Moreover, for example, although the engine is depicted as a single unducted rotor engine, in other embodiments, the engine may include a multi-stage open rotor configuration or a ducted engine, and aspects of the disclosure described herein below may be incorporated therein.

FIG. 2 provides a gas turbine engine 100 having a rotor assembly with a single stage of unducted rotor blades. In such a manner, the rotor assembly may be referred to herein as an "unducted fan," or the entire gas turbine engine 100 may be referred to as an "unducted engine," or an engine having an open rotor propulsion system 102. In addition, the engine of FIG. 2 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal centerline 112 that extends along the axial direction A. In general, the axial direction A extends parallel to the longitudinal centerline 112, the radial direction R extends outward from and inward to the longitudinal centerline 112 in a direction orthogonal to the axial direction A, and the circumferential direction extends three hundred sixty degrees (360°) around the longitudinal centerline 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 2, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 2, the fan 152 is an open rotor or unducted fan 152. As depicted, the fan 152 includes an array of fan blades 154. The fan blades 154 are rotatable, e.g., about the longitudinal centerline 112. In FIG. 2, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 2, the fan 152 is coupled with the LP shaft 138 via a speed reduction gearbox 155, e.g., in an indirect-drive or geared-drive configuration.

Moreover, the fan blades 154 can be arranged in equal spacing around the longitudinal centerline 112. Each fan blade 154 has a root and a tip and a span defined therebetween. Each fan blade 154 defines a central blade axis 156.

For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axis 156.

The fan section 150 further includes a fan guide vane array 160 that includes fan guide vanes 162 (one shown in FIG. 2) disposed around the longitudinal centerline 112. For this embodiment, the fan guide vanes 162 are not rotatable about the longitudinal centerline 112. Each fan guide vane 162 has a root and a tip and a span defined therebetween. The fan guide vanes 162 may be unshrouded as shown in FIG. 2 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. In other embodiments, each fan guide vane 162 may be fixed or unable to be pitched about its central blade axis 164. The fan guide vanes 162 are mounted to a fan cowl 170.

As shown in FIG. 2, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan 184 may be at about the same axial location as the fan blade 154 or the fan guide vanes 162, and radially inward of the fan blade 154 or the fan guide vanes 162. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flow path or fan duct 172. The fan flowpath or fan duct 172 may be referred to as a third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (one shown in FIG. 2). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R. The gas turbine engine 100 includes a spinner 190 is disposed circumferentially around the longitudinal centerline 112 at the forward end 114 of the gas turbine engine 100. By "spinner," it is meant a separate mechanical element (e.g., a cone) that is centered about the longitudinal centerline 112 of the gas turbine engine 100, rotates separately and independently from the fan blades 154 of the gas turbine engine 100, and is located at the forward end 114 of the gas turbine engine 100. The spinner 190 includes a plurality of spinner ribs 200 disposed on a surface of the spinner 190. The plurality of spinner ribs 200 are disposed circumferentially around the spinner 190.

Figure 3:
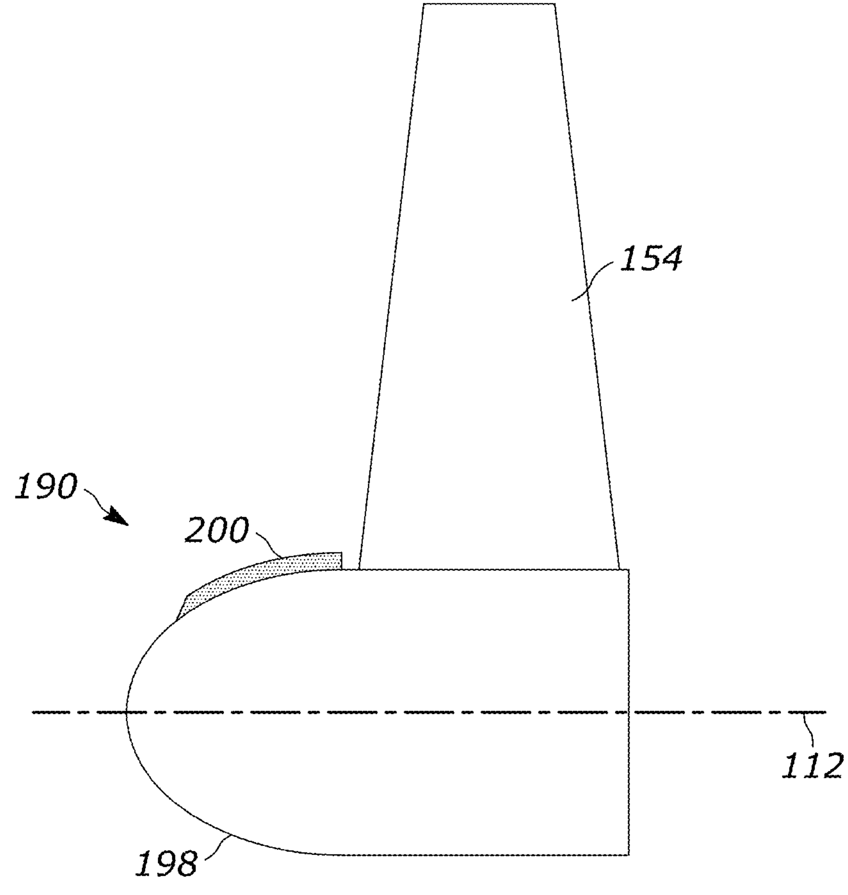
FIG. 3 is a perspective view of a spinner of a propulsion system according to some embodiments.

Next, referring to FIG. 3, the spinner 190 of the gas turbine engine 100 is shown. The spinner 190 includes the plurality of spinner ribs 200 disposed circumferentially around a surface 198 of the spinner 190. While various embodiments and variations to the plurality of spinner ribs 200 are described herein, it is contemplated that the teachings through the various figures may be combined and are not distinct from one another. The spinner 190 is generally a rounded cone disposed around the longitudinal centerline 112. The plurality of spinner ribs 200 may be disposed with a varying location on the spinner 190, size, as discussed in more detail below. During operation, the spinner 190 including the plurality of spinner ribs 200 spins around the longitudinal centerline 112. Similarly, the fan blades 154 spin around the longitudinal centerline 112. The spinner 190 rotates independently from the fan blades 154 such that the rotation of one does not affect the rotation of the other.

As will be described in greater detail below, the spinner 190 including the plurality of spinner ribs 200 may spin in the same direction as the fan blades 154 or in the opposite direction as the fan blades 154. Additionally, the fan blades 154 rotate with a certain rotational speed independent of the spinner 190. The spinner 190 including the plurality of spinner ribs 200, either spinning in the same or opposite direction, spins independently from the fan blades 154. The spinner 190 may rotate at a different rotational speed as compared to the fan blades 154. The present disclosure also contemplates the plurality of spinner ribs 200 as protrusions, extensions, and/or raised members disposed on the spinner 190. The approaches presented herein are different from previous approaches because the spinner 190 and the fan blades 154 rotate independent relative to one another to provide the benefits stated herein.

Figure 4C:
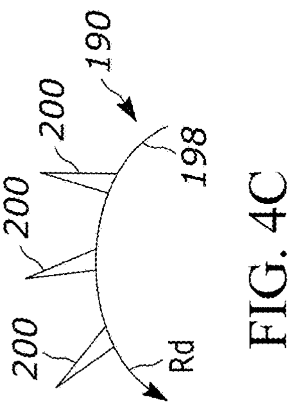
FIG. 4C is a cross-sectional view of a ribbed spinner according to some embodiments.
Figure 4B:
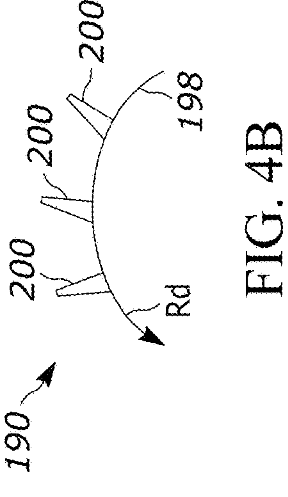
FIG. 4B is a cross-sectional view of a ribbed spinner according to some embodiments.
Figure 4A:
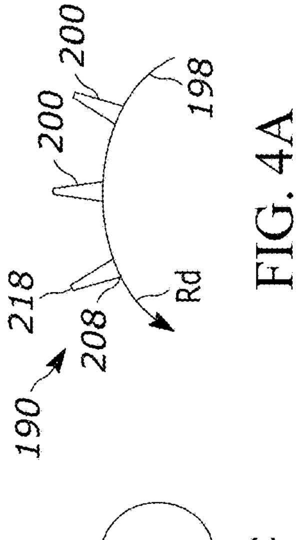
FIG. 4A is a cross-sectional view of a ribbed spinner according to some embodiments.

Referring to FIGS. 4A-4C, the axes of the turbofan engine 10 and the gas turbine engine 100 are shown, including the axial direction A extending into the page, and substantially in line with the longitudinal centerlines 12 and 112 shown in FIGS. 1 and 2, the radial direction R extending outward, and the circumferential direction C extending around. These axes are illustrated in FIGS. 4A-4C and 5A-5C and extend in the same manner. Additionally, in FIGS. 4A-4C and 5A-5C, a rotational direction Rd is shown. The rotational direction Rd, while being illustrated generally in the counterclockwise direction around the longitudinal centerline 12 and 112, as shown in FIGS. 1 and 2 is understood to be non-limiting. For example, as discussed above, it is contemplated that the spinner 190 including the plurality of spinner ribs 200 can spin in either the same or opposite direction as compared to the fan blades 154, shown in FIG. 2. In some embodiments, the fan blades 154 are spinning in the same rotational direction Rd as the spinner 190 illustrated in FIG. 4. In further embodiments, the fan blades 154 are spinner in the opposite rotational direction Rd as the spinner 190. Changing the rotational direction Rd of the spinner 190 as compared to the fan blades 154 can be made in order to increase the pressure, and in turn increase the amount of incoming air as it enters the engine inlet 182.

Still referring to FIGS. 4A-4C, an axial cross-section of the spinner 190 and the plurality of spinner ribs 200 is shown. The plurality of spinner ribs 200 are shown extending circumferentially around and radially outward from the surface 198 of the spinner 190. The plurality of spinner ribs 200 are shown with a generally triangular geometry; however, the specific geometry of the plurality of spinner ribs 200 may take on various shapes depending on the use conditions. The plurality of spinner ribs 200 may include a conical, spherical, ovoid, or elliptical geometry. The plurality of spinner ribs 200 are shown as extending radially outward from the surface 198 from a root 208 coupled to the surface 198 of the spinner 190 to a tip 218. In particular, the plurality of spinner ribs 200 may be glued, bolted, brazed, molded, or integrally formed with the spinner 190. In some embodiments, the plurality of spinner ribs 200 are secured to the spinner 190 from an inside surface thereof.

In one embodiment, as shown in FIG. 4A, the plurality of spinner ribs 200 extend in the normal direction, e.g., perpendicular to a tangent line on the surface 198 of the spinner 190. In a further embodiment, as shown in FIG. 4B, the plurality of spinner ribs 200 are leaned, or cambered, with the direction of the rotational direction Rd, e.g., the root 208 leads the tip 218 of the plurality of spinner ribs 200. In one embodiment, as shown in FIG. 4C, the plurality of spinner ribs 200 are leaned opposite to the direction of the rotational direction Rd, e.g., the tip 218 leads the root 208 of the plurality of spinner ribs 200. In this way, the plurality of spinner ribs 200 may impart additional pressure, and in turn increase the amount of air entering into the turbofan engine 10 or the gas turbine engine 100 via the annular inlet 20 or the engine inlet 182.

Figures 5A, 5B, 5C:
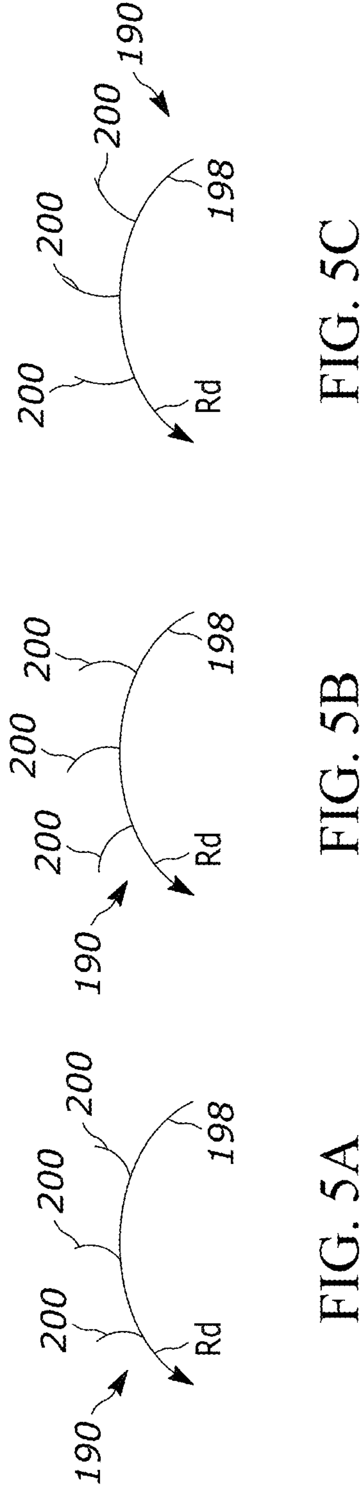
FIG. 5A is a cross-sectional view of a ribbed spinner according to some embodiments.
FIG. 5B is a cross-sectional view of a ribbed spinner according to some embodiments.
FIG. 5C is a cross-sectional view of a ribbed spinner according to some embodiments.

Referring to FIGS. 5A-5C, an axial cross-section of the spinner 190 is shown including the plurality of spinner ribs 200. The plurality of spinner ribs 200 are illustrated including a radial bend in each of the plurality of spinner ribs 200. This radial bend, as shown in FIGS. 5A-5C, may be convex or concave and includes the radial height, as shown in FIG. 11, including a bend. The bend may be of the radial height 214, shown in FIG. 11, and may extend the full axial length 210, as shown in FIG. 10. In some embodiments, the bend is also leaned, as described above with reference to FIGS. 4A-4C. The bend of the plurality of spinner ribs 200 includes bending away from the rotational direction Rd, this results in a concave bend of the plurality of spinner ribs 200, as shown in FIGS. 5A and 5B. In some embodiments, the bend of the plurality of spinner ribs 200 is convex such that the bend faces the rotational direction Rd, as shown in FIG. 5C.

Figures 6A, 6B:
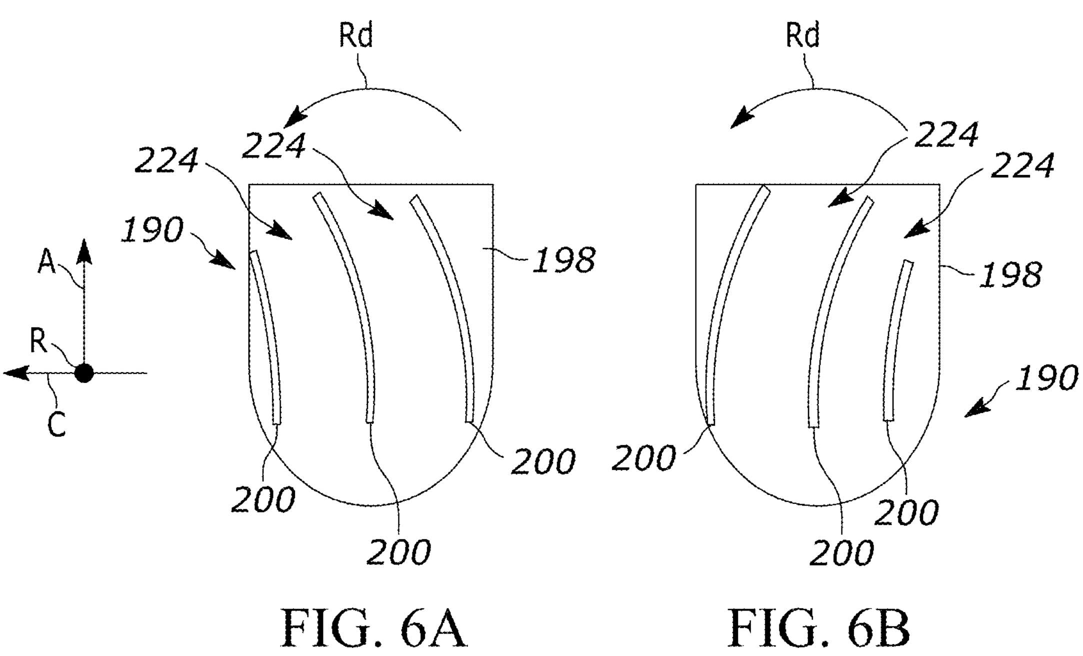
FIG. 6A is a top view of a ribbed spinner according to some embodiments.
FIG. 6B is a top view of a ribbed spinner according to some embodiments.

Referring to FIGS. 6A and 6B, a top view of the plurality of spinner ribs 200 disposed on the spinner 190 is shown. The plurality of spinner ribs 200 are curved in the axial direction A, that is, the axial length 210, as shown in FIG. 11, is curved along the surface 198 of the spinner 190. The axes provided include the axial direction A extending upward on the page, and substantially in line with the longitudinal centerlines 12 and 112 shown in FIGS. 1 and 2, the radial direction R extending out of the page, and the circumferential direction extending across the page from right to left before curving down into the page and coming back out the right side.

Still referring to FIGS. 6A and 6B, the plurality of spinner ribs 200 are illustrated as being curved as they progress in the axial direction down the surface 198 of the spinner 190. As shown, the plurality of spinner ribs 200 can include a concave or convex curve. The concave curve may be considered being curved in the direction of the rotational direction Rd, as shown in FIG. 6A. The convex curve may be considered being curved opposite of the rotational direction Rd, as shown in 6B. In some embodiments the spacing 224 of adjacent spinner ribs 200 may be uniform such that the plurality of spinner ribs 200 are evenly spaced circumferentially around the spinner 190. In further embodiments, the spacing 224 of adjacent spinner ribs 200 is non-uniform such that at least two of the plurality of spinner ribs 200 includes a different spacing 224.

Figures 7A, 7B:
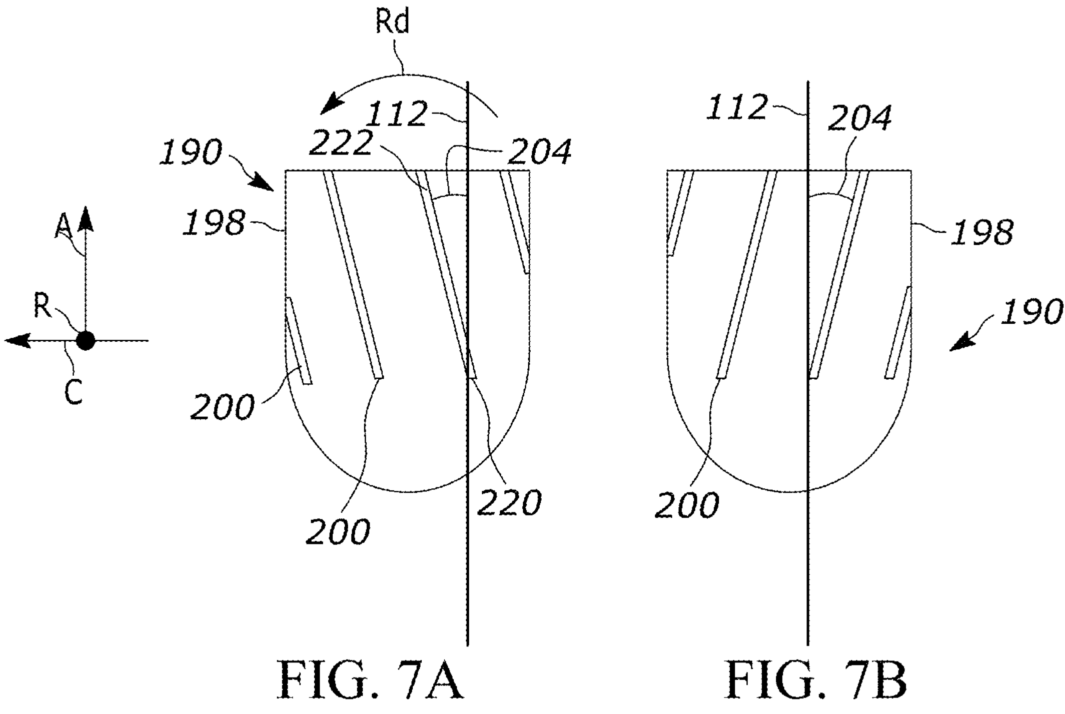
FIG. 7A is a top view of a ribbed spinner according to some embodiments.
FIG. 7B is a top view of a ribbed spinner according to some embodiments.

Referring to FIGS. 7A and 7B, the plurality of spinner ribs 200 are illustrated as extending in a substantially straight line as they progress axially on the spinner 190. In this way, the most aft portion, e.g., the leading edge 220, closest to the forward end 114 of the gas turbine engine 100 is in line with the trailing edge 222 of the plurality of spinner ribs 200. In some embodiments, the plurality of spinner ribs 200 include an angle 204 relative to the longitudinal centerline 12 and the longitudinal centerline 112. The angle 204 may range from −45°, as shown in FIG. 7A, to 45°, as shown in FIG. 7B, relative to the longitudinal centerline 12 and longitudinal centerline 112 when viewed from the top. In further embodiments, the angle can be 0° such that the plurality of spinner ribs 200 extend substantially parallel to the longitudinal centerline 12 and longitudinal centerline 112.

Figures 8A, 8B:
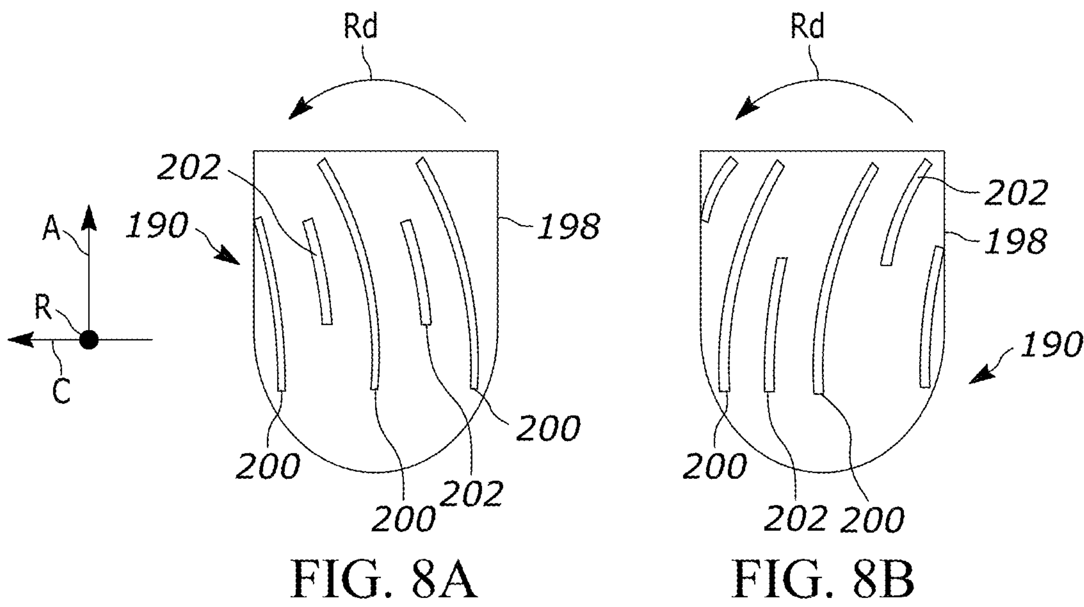
FIG. 8A is a top view of a ribbed spinner according to some embodiments.
FIG. 8B is a top view of a ribbed spinner according to some embodiments.
Figures 9A, 9B:
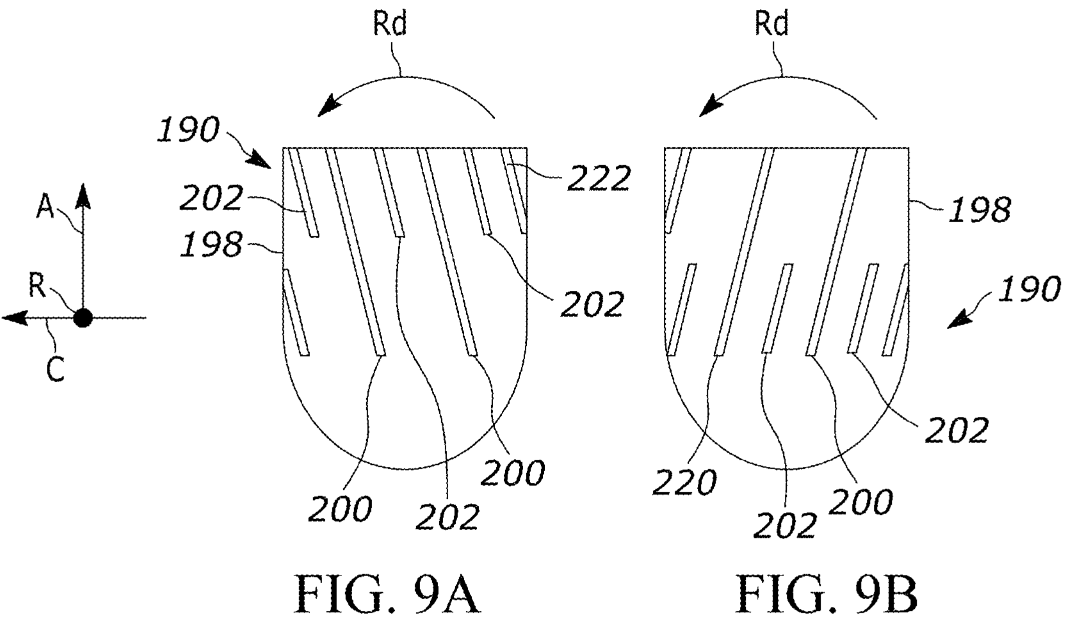
FIG. 9A is a top view of a ribbed spinner according to some embodiments.
FIG. 9B is a top view of a ribbed spinner according to some embodiments.

Referring to FIGS. 8A and 8B and 9A and 9B, the plurality of spinner ribs 200 are shown as including additional discrete spinner ribs 202 placed in between the plurality of spinner ribs 200. The aft position, as described with reference to FIG. 11, of the additional discrete spinner ribs 202 may be different as compared to the plurality of spinner ribs 200. For example, the additional discrete spinner ribs 202 may be placed further back axially than the plurality of spinner ribs 200, as shown in FIGS. 8A and 9A. In some embodiments, the additional discrete spinner ribs 202 are placed at varying aft positions as compared to the plurality of spinner ribs 200 such that adjacent additional discrete spinner ribs 202 include different axial positions, as shown in FIG. 8B.

Still referring to FIGS. 8A and 8B and 9A and 9B, the additional discrete spinner ribs 202 can be aligned with the leading edge 220 of the plurality of spinner ribs 200, as shown in FIGS. 8B and 9B, or alternatively, be aligned with the trailing edge 222 of the plurality of spinner ribs 200, as shown in FIG. 9A. The additional discrete spinner ribs 202 can be curved or substantially a straight line. Further, the additional discrete spinner ribs 202 can be angled relative to the longitudinal centerline 12 and longitudinal centerline 112. The angle of the additional discrete spinner ribs 202 can be the same or different than the angle 204, as shown in FIG. 7, of the plurality of spinner ribs 200. In embodiments utilizing straight line spinner ribs 200 and additional discrete spinner ribs 202, if the same angle for both is used, the spinner ribs 200 will be substantially parallel to the additional discrete spinner ribs 202, as shown in FIGS. 9A and 9B.

Figures 10A, 10B:
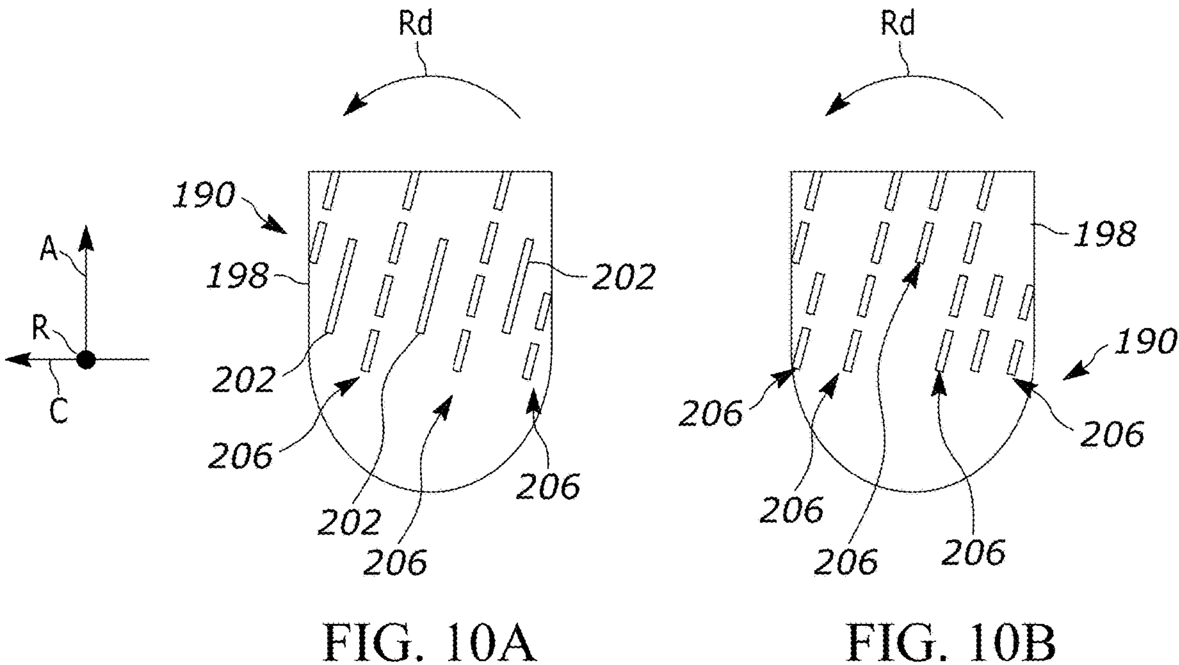
FIG. 10A is a top view of a ribbed spinner according to some embodiments.
FIG. 10B is a top view of a ribbed spinner according to some embodiments.
Figure 11:
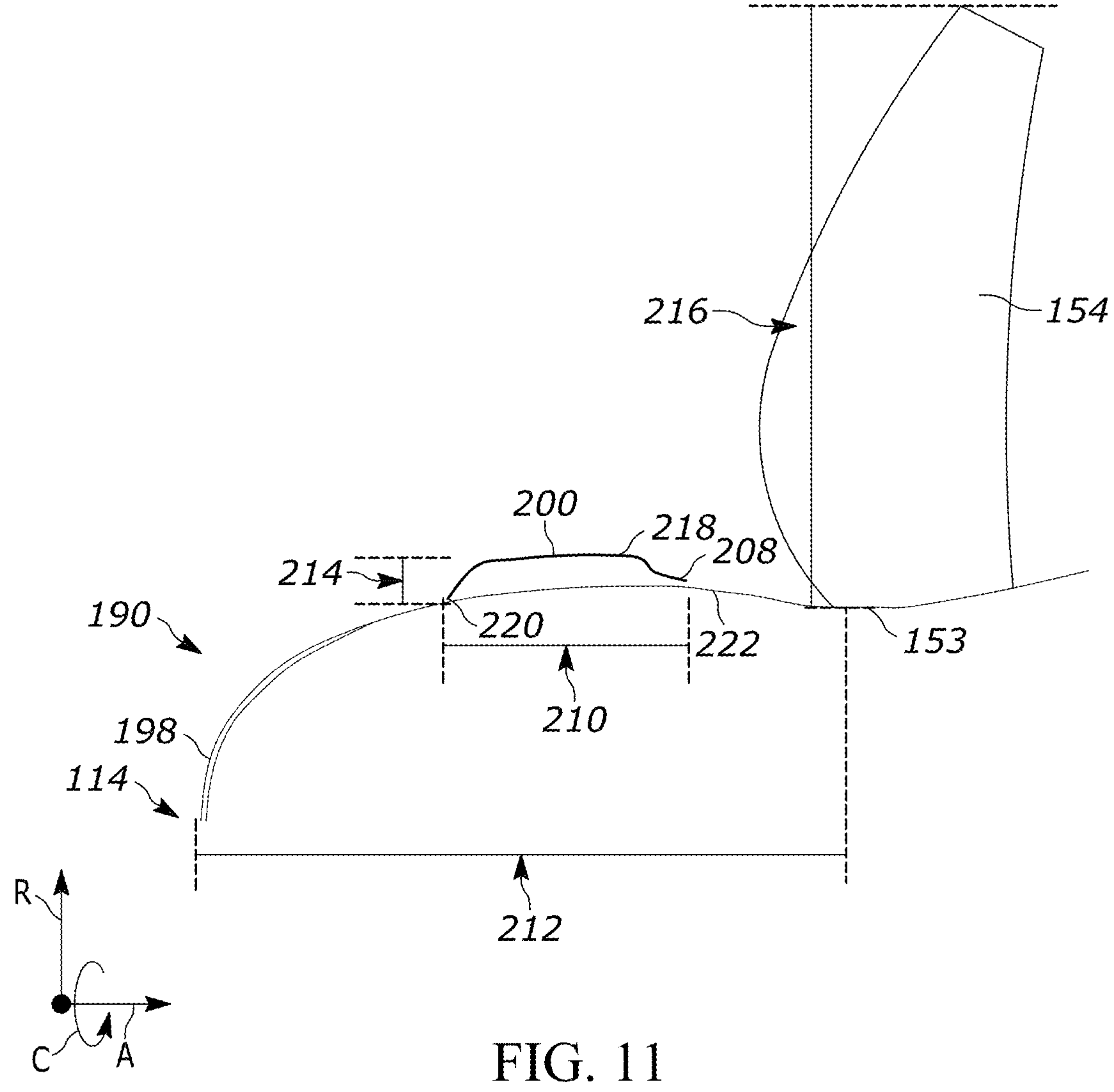
FIG. 11 is a side cross-sectional view of a ribbed spinner disposed on a propulsion system according to some embodiments.

Referring to FIGS. 10A and 10B, the spinner 190 is shown including the additional discrete spinner ribs 202 and spinner ribs 200 which comprise a plurality of discrete portions 206. The plurality of discrete portions 206 include several smaller pieces comprising a single rib such that the plurality of discrete portions 206 are substantially in line with one another. Similar to the plurality of spinner ribs 200, may be straight or curved. Further, similar to the additional discrete spinner ribs 202 described above with reference to the plurality of spinner ribs 200, the plurality of discrete portions 206 may have different axial positions. By changing the axial positions of the plurality of spinner ribs 200, a particular aerodynamic profile may be determined and/or achieved for each particular use.

Referring to FIG. 11, a cross-sectional view of a portion of the gas turbine engine 100 is shown. The spinner 190 is illustrated with an axial length 212 extending from the forward end 114 to the leading edge 153 of one of the fan blades 154. The axial length 212 extending in the axial direction A along the longitudinal centerline 112. The plurality of spinner ribs 200 are disposed on the spinner 190 including an axial length 210 extending from the leading edge 220 to the trailing edge 222. The axial length 210 of the plurality of spinner ribs 200 extends in the axial direction A along the longitudinal centerline 112. The location of the plurality of spinner ribs 200 on the spinner 190, and more specifically the location as compared to the axial length 210, is referred to as the aft position of the plurality of spinner ribs 200, and in particular, the leading edge 220. As used herein, the aft position includes the location of the corresponding element, e.g., the spinner ribs 200, determined from the forward end 114 of the gas turbine engine 100 or the spinner 190, which as noted above, is at the upstream portion of the gas turbine engine 100 gas turbine engine 100. For example, a 0% aft position includes the plurality of spinner ribs 200 being coupled to a tip of the spinner 190 at the most forward end 114 of the gas turbine engine 100.

In one embodiment, the plurality of spinner ribs 200 include a uniform aft position on the spinner 190. In further embodiments, there is a non-uniform aft position of the plurality of spinner ribs 200. These embodiments include both the use of the plurality of spinner ribs 200, additional discrete spinner ribs 202, and plurality of discrete portions 206. The aft position of the plurality of spinner ribs 200 may be disposed between 0-90%. The aft position and the axial length 210 of the plurality of spinner ribs 200 relate to one another. For example, a 40% axial length 210 spinner rib 200 has a corresponding aft position that ranges from 0-60%.

Still referring to FIG. 11, the plurality of spinner ribs 200 include a radial height 214. The radial height 214, or span of the plurality of spinner ribs 200, extends in the radial direction R, substantially outward from the surface 198 of the spinner 190 from the root 208 to the tip 218. The fan blades 154 also include an associated radial height 216, or a span. In one embodiment, the radial height 214 of the plurality of spinner ribs 200 varies along the axial length 210 of the plurality of spinner ribs 200, as shown in FIG. 11. In a further embodiment, the radial height 214 is substantially the same along the axial length 210 of the plurality of spinner ribs 200. In one embodiment, the radial height 214 is approximately 10% of the radial height 216 of the fan blades 154. The radial height 214 may range from 1-20% of the radial height 216 of the fan blades 154.

In one embodiment, the axial length 210 of the plurality of spinner ribs 200 extending radially from the longitudinal centerline 112 is about 10-100% of the axial length 212 of the spinner 190. In one exemplary embodiment, the axial length 210 of the plurality of spinner ribs 200 is about 20-40% of the axial length 212 of the spinner 190. The axial length 212 of the plurality of spinner ribs 200 is greater than the radial height 216.

As the air flows past and contacts the spinner 190 and plurality of spinner ribs 200, the plurality of spinner ribs 200 impart additional pressure onto the portion of the airflow which contacts the spinner ribs 200. The additional pressure created by the airflow contacting and passing by the spinner ribs 200 creates additional disturbances in vectors associated with the air as it flows past and contacts the plurality of spinner ribs 200. The additional disturbances in the vectors associated with the air create further disturbances of adjacent air passing by the spinner. This results in a less smooth flow, helps to avoid surface losses, and increases the amount (e.g., volume, flowrate and/or pressure) of airflow entering the annular inlet 20 or the engine inlet 182. The variations of the plurality of spinner ribs 200 disclosed herein aid in increasing the disturbance of vectors of the air flowing past the plurality of spinner ribs 200. For example, by rotating the plurality of spinner ribs 200 in the opposite direction of the fan blades 40 or the fan blades 154, changing the aft position, radial height, axial length, and other factors described herein, the plurality of spinner ribs 200 may impart additional pressure, and in turn increase the amount of incoming air. In the approaches described herein, the various ranges and ratios are used to optimize the additional pressure imparted onto the portion of airflow which contacts the spinner ribs 200. The optimization, in part, includes the spinner ribs 200 having a greater axial length 212 than a radial height 216. This allows for a longer than tall spinner ribs 200 which provides more localized pressure increases near the hub.

Further, the plurality of spinner ribs 200 can optimize hub flow and pressure as air enters the annular inlet 20 or engine inlet 182, this can increase hub pumping and subsequent flow to the inlets and boost core pressure. For example, in one embodiment, the spinner 190 and fan blades 154 spin at substantially the same angular velocity (RPM). The fan blades 154, as shown in FIG. 2., include a twist that changes from the root to the tip to provide a near constant pressure ratio along the span from root to tip. The twist is included to account for the slower liner velocity of the portion of the fan blades 154 near the root. Because the portion of the fan blades 154 near the root is closer to the axis of rotation, that portion has a slower the linear velocity. In some instances, the pressure ratio and ability to pump air near the root of the fan blade 154 can drop off. Because of this, the plurality of spinner ribs 200 are disposed along the surface 198 of the spinner 190 to add additional pressure, and in turn energy, to incoming air to improve the movement of air near the hub, adjacent to the root portion of the fan blades 154.

The plurality of spinner ribs 200 also aid in protecting the annular inlet 20 and engine inlet 182 from ingestion events of foreign objects, such as birds. The addition of the plurality of spinner ribs 200 onto the spinner 190 also provides the ability to control spinner vibration modes and frequencies adding stiffness to the spinner, while also providing the ability to decrease the thickness and weight of the spinner 190 due to the added stiffness.

Figure 12:
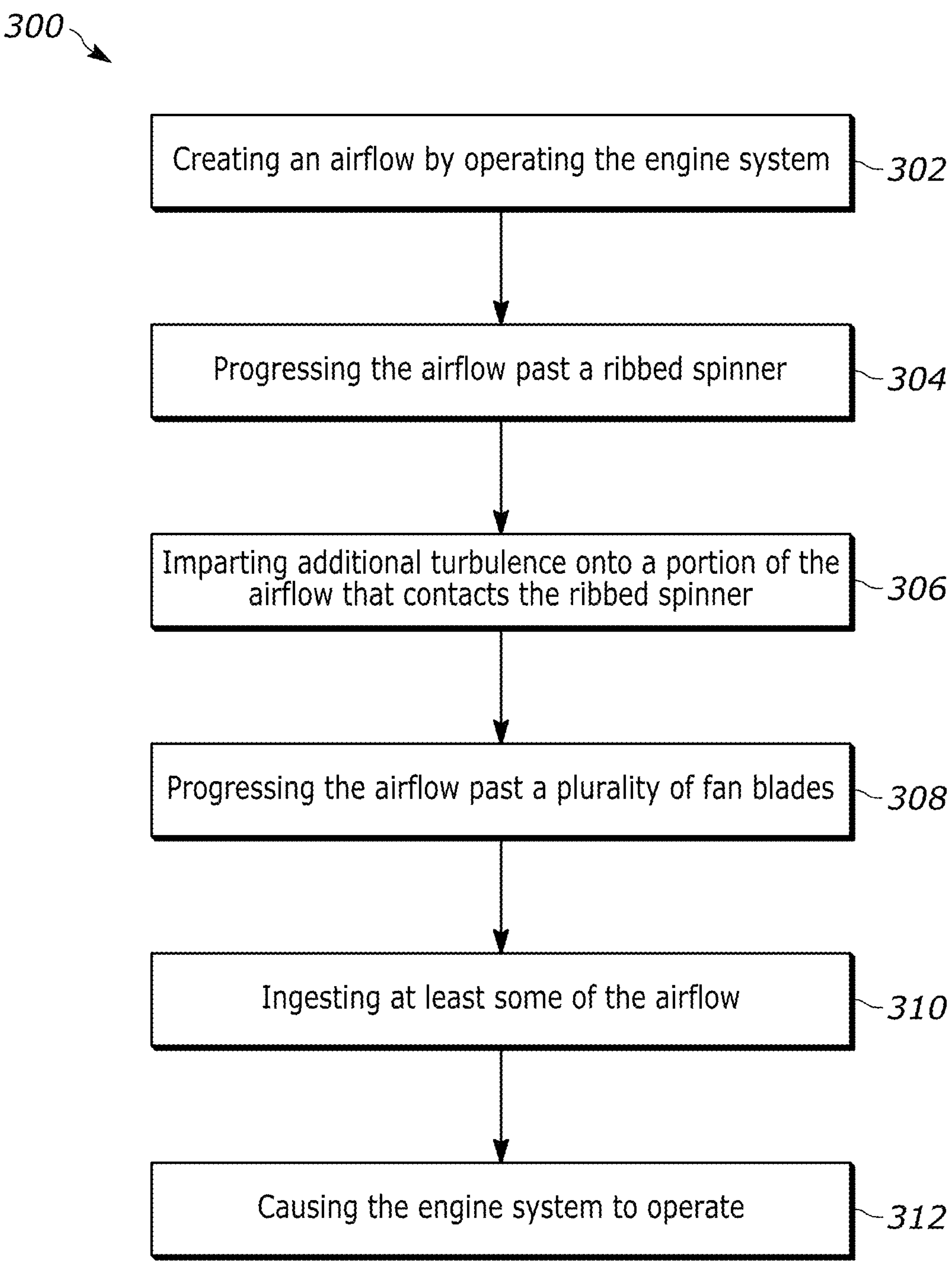
FIG. 12 is a flowchart of a method for directing air into an inlet of an engine system according to some embodiments.

Referring to FIG. 12, a method 300 for directing air into an annular inlet 20 of the turbofan engine 10 or an engine inlet 182 of a gas turbine engine 100 is provided. The method 300 includes creating 302 an airflow by operating the turbofan engine 10 or the gas turbine engine 100. The method 300 further includes progressing 304 the airflow past the ribbed spinner 190, including the plurality of spinner ribs 200 disposed thereon. The airflow contacts and passes through the plurality of spinner ribs 200. The method further includes imparting 306 additional pressure onto the portion of the airflow that contacts and passes by the plurality of spinner ribs 200 of the ribbed spinner 190. The method 300 includes progressing 308 the airflow past a plurality of fan blades 40 and 154. The method 300 further ingesting 310 at least some of the airflow into the annular inlet 20 or engine inlet 182 of the engine system. The method 300 includes causing 312 the turbofan engine 10 or the gas turbine engine 100 to operate using the ingested airflow.

Further aspects of the disclosure are provided by the subject matter of the following clauses:

An engine system including a spinner disposed at a forward end of the engine system, wherein the spinner is disposed about a longitudinal centerline of the engine system; a plurality of spinner ribs disposed on a surface of the spinner and extending radially outward from the longitudinal centerline, wherein the spinner and the plurality of spinner ribs are configured to rotate about the longitudinal centerline of the engine system, wherein the plurality of spinner ribs include an axial length that is greater than a radial height; and a plurality of fan blades disposed downstream of the spinner, wherein the plurality of fan blades extend radially outward from the longitudinal centerline and are configured to rotate about the longitudinal centerline of the engine system; wherein the spinner and the plurality of spinner ribs are configured to rotate independently from the plurality of fan blades and impart additional pressure onto incoming air as the incoming air contacts and passes by the spinner and the plurality of fan blades.

The engine system of the preceding clause, wherein the spinner including the plurality of spinner ribs is configured to rotate in a same direction of the plurality of fan blades about the longitudinal centerline.

The engine system of any preceding clause, wherein the spinner including the plurality of spinner ribs is configured to rotate in an opposite direction of the plurality of fan blades about the longitudinal centerline.

The engine system of any preceding clause, wherein the spinner and the plurality of spinner ribs are configured to rotate at a substantially same rotational rate as the plurality of fan blades.

The engine system of any preceding clause, wherein the spinner and the plurality of spinner ribs are configured to rotate at a different rotational rate as the plurality of fan blades.

The engine system of any preceding clause, wherein thee axial length of the plurality of spinner ribs extends along from the longitudinal centerline, wherein the axial length of the plurality of spinner ribs is 10-100% of an axial length of the spinner.

The engine system of any preceding clause, wherein the plurality of spinner ribs are disposed circumferentially around the spinner.

The engine system of any preceding clause, wherein the plurality of spinner ribs are disposed with a uniform spacing around the spinner.

The engine system of any preceding clause, wherein the plurality of spinner ribs are disposed with a uniform angle relative to the longitudinal centerline around the spinner.

The engine system of any preceding clause, wherein the plurality of spinner ribs are disposed with a uniform aft position relative to the axial length of the spinner.

The engine system of any preceding clause, wherein the radial height of the plurality of spinner ribs extends radially outward from the longitudinal centerline and the surface of the spinner, and wherein the plurality of fan blades include a radial height extending radially outward from the longitudinal centerline.

The engine system of any preceding clause, wherein the radial height of the plurality of spinner ribs is 10% of the radial height of the plurality of fan blades.

The engine system of any preceding clause, wherein the radial height of the plurality of spinner ribs varies long the axial length of the plurality of spinner ribs extending along from the longitudinal centerline.

The engine system of any preceding clause, wherein a number of spinner ribs is greater than a number of fan blades.

The engine system of any preceding clause, wherein the plurality of spinner ribs are comprised of a plurality of discrete portions substantially in line with one another.

The engine system of any preceding clause, wherein the plurality of spinner ribs are curved towards a direction of rotation of the spinner.

The engine system of any preceding clause, wherein the plurality of spinner ribs are curved away from a direction of rotation of the spinner.

The engine system of any preceding clause, wherein the plurality of spinner ribs are staggered along an axial length of the spinner, the axial length of the spinner extending along the longitudinal centerline.

The engine system of any preceding clause, wherein the plurality of spinner ribs include an acoustic liner disposed on a surface of the plurality of spinner ribs or within the plurality of spinner ribs.

A method for directing air into an inlet of an engine system, the method including: creating an airflow by operating the engine system; progressing the airflow past a ribbed spinner, wherein a portion of the airflow contacts the ribbed spinner; imparting additional pressure onto the portion of the airflow when the portion of the airflow contacts the ribbed spinner; progressing the airflow past a plurality of fan blades disposed downstream of the ribbed spinner, wherein the ribbed spinner and the plurality of fan blades rotate about a longitudinal centerline independently from the plurality of fan blades; ingesting at least some of the airflow into the inlet of the engine system; and causing the engine system to operate using the ingested airflow.

What is claimed is:

1. An engine system comprising:

a spinner disposed at a forward end of the engine system, wherein the spinner is disposed about a longitudinal centerline of the engine system;

a plurality of spinner ribs disposed on a surface of the spinner and extending radially outward from the longitudinal centerline, wherein the spinner and the plurality of spinner ribs are configured to rotate about the longitudinal centerline of the engine system, wherein the plurality of spinner ribs include an axial length that is at least 1.5 times greater than a radial height of the plurality of spinner ribs; and a plurality of fan blades disposed downstream of the spinner, wherein the plurality of fan blades extend radially outward from the longitudinal centerline and are configured to rotate about the longitudinal centerline of the engine system, wherein the plurality of fan blades includes a radial height;

wherein the spinner and the plurality of spinner ribs rotate and impart additional pressure onto incoming air as the incoming air contacts and passes by the spinner and the plurality of fan blades, wherein the radial height of the plurality of spinner ribs is 1-20% of the radial height of the plurality of fan blades.

2. The engine system of claim 1 wherein the spinner including the plurality of spinner ribs is configured to rotate in a same direction of the plurality of fan blades about the longitudinal centerline.

3. The engine system of claim 1 wherein the axial length of the plurality of spinner ribs extends along from the longitudinal centerline, wherein the axial length of the plurality of spinner ribs is 10-100% of an axial length of the spinner.

4. The engine system of claim 1 wherein the plurality of spinner ribs are disposed circumferentially around the spinner.

5. The engine system of claim 4 wherein the plurality of spinner ribs are disposed with a uniform spacing around the spinner.

6. The engine system of claim 4 wherein the plurality of spinner ribs are disposed with a uniform angle relative to the longitudinal centerline around the spinner.

7. The engine system of claim 4 wherein the plurality of spinner ribs are disposed with a uniform aft position relative to the axial length of the spinner.

8. The engine system of claim 1 wherein the radial height of the plurality of spinner ribs extends radially outward from the longitudinal centerline and the surface of the spinner, and wherein the plurality of fan blades include a radial height extending radially outward from the longitudinal centerline.

9. The engine system of claim 8 wherein the radial height of the plurality of spinner ribs is 10% of the radial height of the plurality of fan blades.

10. The engine system of claim 1 wherein the radial height of the plurality of spinner ribs varies along the axial length of the plurality of spinner ribs extending along from the longitudinal centerline.

11. The engine system of claim 1 wherein a number of spinner ribs is greater than a number of fan blades.

12. The engine system of claim 1 wherein the plurality of spinner ribs are comprised of a plurality of discrete portions substantially in line with one another.

13. The engine system of claim 1 wherein the plurality of spinner ribs are curved towards a direction of rotation of the spinner.

14. The engine system of claim 1 wherein the plurality of spinner ribs are curved away from a direction of rotation of the spinner.

15. The engine system of claim 1 wherein the plurality of spinner ribs are staggered along an axial length of the spinner, the axial length of the spinner extending along the longitudinal centerline.

16. The engine system of claim 1 wherein the plurality of spinner ribs include an acoustic liner disposed on a surface of the plurality of spinner ribs or within the plurality of spinner ribs.

17. A method for directing air into an inlet of an engine system, the method comprising:

creating an airflow by operating the engine system of claim 1;

progressing the airflow past the spinner wherein the spinner is a ribbed spinner, wherein a portion of the airflow contacts the ribbed spinner;

imparting additional pressure onto the portion of the airflow when the portion of the airflow contacts the ribbed spinner;

progressing the airflow past the plurality of fan blades disposed downstream of the ribbed spinner, wherein the ribbed spinner and the plurality of fan blades rotate about a longitudinal centerline;

ingesting at least some of the airflow into the inlet of the engine system; and causing the engine system to operate using the ingested airflow.

18. The engine system of claim 1 wherein an axial forward end of the plurality of spinner ribs are disposed with a uniform aft position relative to the axial length of the spinner.

* * * * *